G. W. Daniels.

Lathe Chuck.

N° 21,864.   Patented Oct. 19, 1858.

UNITED STATES PATENT OFFICE.

G. W. DANIELS, OF WALTHAM, MASSACHUSETTS, ASSIGNOR TO HIMSELF AND A. FULLER, OF SAME PLACE.

LATHE FOR CUTTING SCREWS FROM WIRE.

Specification of Letters Patent No. 21,864, dated October 19, 1858.

*To all whom it may concern:*

Be it known that I, GEORGE W. DANIELS, of Waltham, in the county of Middlesex and State of Massachusetts, have invented an Improvement in Lathes for Turning or for Cutting Screws from Wire; and I do hereby declare that the same is fully described and represented in the following specification and the accompanying drawings, of which—

Figure 1:
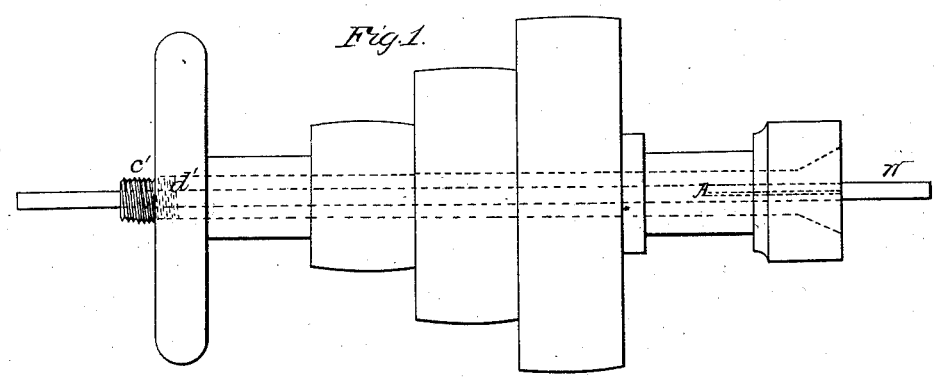
Figure 2:
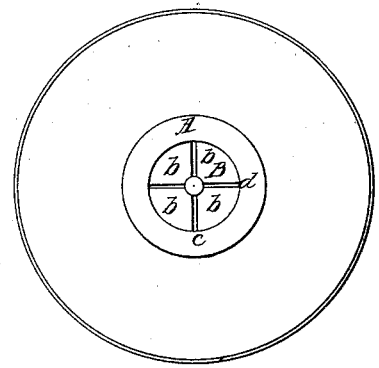

Figure 1, is a side view; Fig. 2, a front end view, and Fig. 3, a longitudinal section of a lathe arbor containing my invention.

It is well known that in making small screws from wire and by means of a lathe, it becomes important to have some means not only of holding the wire firmly in the arbor, but of maintaining it centralized with respect to the arbor. It also becomes necessary that the holding device should be of such a nature as to enable the wire to be readily drawn forward in and clamped to the arbor immediately after such screw has been formed in it and detached from it. My invention not only has all these merits, but also a further one, viz, that of causing the holding jaws to hold stronger on the wire, as the strain on it is increased during the operation of turning it or of forming a screw thread on it.

Figure 3:
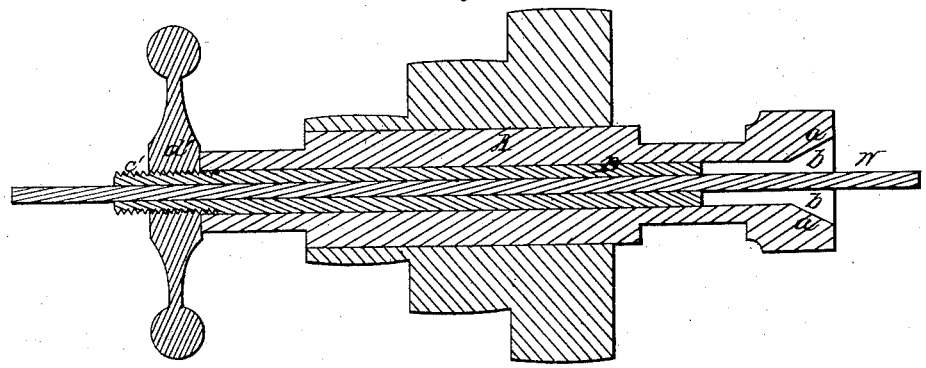

In carrying out my invention, the lathe arbor A is to be made tubular throughout its entire length the bore of the tube at its front end being enlarged in a tapering or conical form as shown at $a$, $a$, in Fig. 3. This bore is to contain a hollow spindle or tube B, whose front end terminates in expanding jaws $b$, $b$, $b$, $b$, formed by a conic frustum sawed axially in two directions as shown at $c$, $d$, in Fig. 2. This frustum extends into the conical mouth $a$, $a$, of the arbor.

On that part of the spindle B, which extends beyond the rear end of the arbor, a male screw $c'$, is to be cut, the screw being made to extend a short distance within the bore of the arbor. On this screw a hand nut or wheel $d'$, is screwed and against the rear end of the arbor, so that when screwed up against the same, it will retract the spindle and so draw the jaws closely into the conical mouth of the arbor, as to cause the jaws to close or move toward each other and firmly clamp a wire when placed in and made to project from the bore of the spindle as shown by the blue lines at W, W.

As while the arbor is in revolution in the headstock of the lathe and the wire is being reduced by a tool or screw cutter, there will be a strong tendency of the wire to cause the spindle to revolve within the arbor, the male screw of such arbor should have its thread run in such a direction on the spindle as to cause the nut or wheel to tighten against the arbor by the turning of the spindle in conjunction with the friction of the nut against the end of the arbor. If the cutting force tends to turn the spindle to the left, the screw of the spindle should pitch or rise to the right, and vice versa.

In operating with the machine or invention, unscrewing of the hand wheel or nut will loosen the hold of the jaws on the wire. This may be done with great despatch. The reverse operation will tighten the jaws upon it, the wire being centralized in the arbor by the act of clamping it thereto.

I am aware that handles for tool holders have been made with a holding and centering apparatus of the kind substantially like that above described as applied to the arbor of a lathe, with the exception that the bore of their spindle did not extend through such, therefore I do not claim the said holding and centering apparatus, either alone or in connection with a tool handle.

I am also aware that a lathe arbor has had a passage extended through it longitudinally and axially and that such passage has opened into a hollow hub or boss containing two metallic bearings one of which was forced toward the other by a screw arranged transversely on the arbor, the whole being simply for clamping a round shaft on a lathe in order that a concavity might be turned in one end of it. But such devices could only center or bring into one straight line or the axis of the arbor, a shaft of but one diameter. Therefore I do not claim this latter contrivance, it being shown in Henry A. Case's rejected application. My improved lathe with reference to a round rod extending through the arbor can perform a function not incident to the lathe of the said Case.

I claim—

Combining with a lathe arbor, devices made and applied to it substantially as described so as to enable rods varying in diameter to be securely clamped and centered in the arbor, and to extend entirely through it in manner as specified.

In testimony whereof I have hereunto set my signature.

GEO. W. DANIELS.

Witnesses:
R. H. EDDY,
F. P. HALE, JR.